United States Patent

Ellis et al.

[11] Patent Number: 5,851,095
[45] Date of Patent: Dec. 22, 1998

[54] CAPTIVE SCREW

[75] Inventors: Thomas J. Ellis, Wilmington, Del.; Edward A. McCormack, Chadds Ford; Harry L. Dickerson, Downingtown, both of Pa.

[73] Assignee: Southco, Inc., Concordville, Pa.

[21] Appl. No.: 59,577

[22] Filed: Apr. 14, 1998

[51] Int. Cl.⁶ .............................. F16B 21/18; F16B 39/00
[52] U.S. Cl. ........................ 411/353; 411/107; 411/396; 411/552
[58] Field of Search ................................ 411/107, 352, 411/353, 383, 396, 552, 970, 999

[56] References Cited

U.S. PATENT DOCUMENTS

| 283,591 | 4/1883 | Swanstrom ............................... D8/387 |
| D. 357,176 | 4/1995 | Ernest et al. ............................. D8/387 |
| D. 388,316 | 12/1997 | McDonough et al. .................... D8/387 |
| 748,078 | 12/1903 | Kaisling . |
| 1,166,345 | 12/1915 | Gates . |
| 1,188,420 | 6/1916 | Eadie . |
| 1,664,820 | 4/1928 | Hughes . |
| 2,006,359 | 7/1935 | Lackner . |
| 2,151,255 | 3/1939 | Witchger . |
| 2,331,322 | 10/1943 | Heinick . |
| 2,470,927 | 5/1949 | Hale, Jr. . |
| 2,503,189 | 4/1950 | Biga, Jr. .............................. 411/396 X |
| 2,553,236 | 5/1951 | Bratfisch . |
| 2,773,574 | 12/1956 | Able ...................................... 192/43.1 |
| 2,831,520 | 4/1958 | Clarke . |
| 2,967,557 | 1/1961 | Tait et al. . |
| 2,987,811 | 6/1961 | Acres ....................................... 29/437 |
| 3,033,260 | 5/1962 | Snow . |
| 3,052,942 | 9/1962 | Mulvaney ................................ 24/224 |
| 3,059,736 | 10/1962 | Boyd ....................................... 189/36 |
| 3,126,935 | 3/1964 | Tuozzo . |
| 3,137,336 | 6/1964 | Wing . |
| 3,180,389 | 4/1965 | Frank . |
| 3,195,600 | 7/1965 | Middleton, Jr. . |

(List continued on next page.)

FOREIGN PATENT DOCUMENTS

| 558456 | 6/1958 | Canada . |
| 1339942 | 11/1962 | France . |
| 2 268977 | 4/1975 | France . |
| 2 578009 | 2/1986 | France . |
| 2 636384 | 9/1988 | France . |
| 625345 | 6/1949 | United Kingdom .................. 411/396 |
| 626013 | 9/1949 | United Kingdom . |
| 825877 | 12/1959 | United Kingdom . |
| 1579730 | 11/1980 | United Kingdom . |

OTHER PUBLICATIONS

Southco, Inc., Southco Latches and Access Hardware Handbook 45 NA, C1–C44, Pennsylvania, 1995.
Penn Engineering & Manufacturing Corp., Fasteners For Use In Or With PC Boards:, Pem Bulletin K–488, (Danboro, PA) 1980.
Camloc Fasteners, "Captive Screws", Catalog No. 3800, pp. 1–12 (Hasbrouck Heights, NJ).
Southco Fasteners Handbook 43, pp. C1–C11, C18–C27, (Pennsylvania) 1993.
American Society For Metals, Source Book on Cold Forming, pp. 83–87 (Ohio, 44073).
Huck International, Inc., "Captive Fasteners and Rivetless Nut Plates", (California, 90712) 1996.
Penn Engineering & Manufacturing Corp., Snap–Top Standoffs:, Pem Bulletin SSA–988, (Danboro, PA) 1987.

(List continued on next page.)

*Primary Examiner*—Neill Wilson
*Attorney, Agent, or Firm*—Paul & Paul

[57] ABSTRACT

A captive screw attachable an upper panel, for attaching the upper panel to a lower surface, the lower surface having a threaded hole, the captive screw having a screw, a ferrule that attaches to the upper panel, a thin-walled, cylindrical hollow knob and protrusions integral to the outer perimeter of the head portion of the screw to rigidly secure the perimeter of the head of the screw to the inner surface of the knob, the protrusions providing a press-fit of the screw to the inner surface of the knob where the screw is pressed into the knob from the underside of the knob.

17 Claims, 5 Drawing Sheets

U.S. PATENT DOCUMENTS

| | | | |
|---|---|---|---|
| 3,204,680 | 9/1965 | Barry . | |
| 3,209,807 | 10/1965 | Ryner . | |
| 3,244,212 | 4/1966 | Barry . | |
| 3,245,450 | 4/1966 | Sauter . | |
| 3,250,559 | 5/1966 | Sommerfeld | 292/251 |
| 3,263,728 | 8/1966 | Lynch . | |
| 3,279,302 | 10/1966 | Modrey . | |
| 3,343,581 | 9/1967 | Martin et al. . | |
| 3,346,032 | 10/1967 | Gulistan | 411/999 X |
| 3,385,341 | 5/1968 | Garstkiewicz . | |
| 3,437,119 | 4/1969 | Dey . | |
| 3,465,803 | 9/1969 | Earnest et al. . | |
| 3,564,563 | 2/1971 | Trotter et al. | 24/221 |
| 3,571,904 | 3/1971 | Gulistan | 29/443 |
| 3,718,950 | 3/1973 | Engstrom | 24/217 |
| 3,912,411 | 10/1975 | Moffat | 403/259 |
| 3,958,308 | 5/1976 | Gooding | 24/221 |
| 4,007,516 | 2/1977 | Coules | 24/221 |
| 4,047,266 | 9/1977 | Bisbing | 24/221 |
| 4,078,414 | 3/1978 | Orain | 72/354 |
| 4,367,643 | 1/1983 | Hackett | 72/353 |
| 4,387,497 | 6/1983 | Gulistan | 29/511 |
| 4,398,322 | 8/1983 | Ewen | 24/201 |
| 4,399,682 | 8/1983 | Hackett | 72/359 |
| 4,602,903 | 7/1986 | Wilburn | 411/222 |
| 4,692,075 | 9/1987 | Metz | 411/7 |
| 4,915,557 | 4/1990 | Stafford | 411/107 |
| 4,952,107 | 8/1990 | Dupree | 411/103 |
| 4,964,773 | 10/1990 | Schmidt | 411/373 |
| 4,975,007 | 12/1990 | Molina | 411/107 |
| 5,042,880 | 8/1991 | Garuti et al. | 301/9 DN |
| 5,094,579 | 3/1992 | Johnson | 411/107 |
| 5,209,018 | 5/1993 | Heinrich | 49/449 |
| 5,336,028 | 8/1994 | Yamamoto | 411/107 |
| 5,338,139 | 8/1994 | Swanstrom | 411/353 |
| 5,382,124 | 1/1995 | Frattarola | 411/970 X |
| 5,388,139 | 2/1995 | Swanstrom | 411/999 X |
| 5,544,992 | 8/1996 | Ciobanu et al. | 411/353 |
| 5,611,654 | 3/1997 | Frattarola et al. | 411/999 X |
| 5,642,972 | 7/1997 | Ellis et al. | 411/970 X |

OTHER PUBLICATIONS

Penn Engineering & Manufacturing Corp., "Type PF11 Self–Clinching Panel Fastener Assembly", Pem Bulletin PF11–297, (Danboro, PA) 1997.

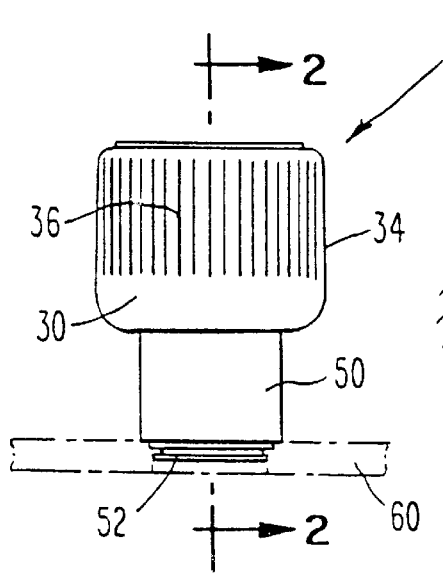
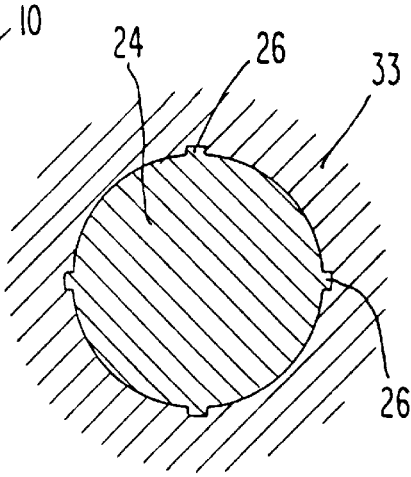
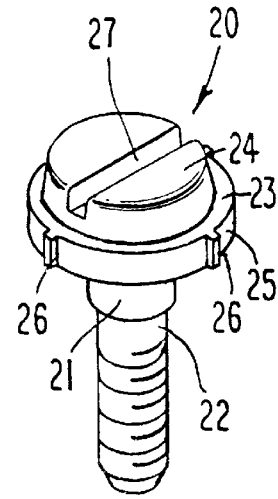
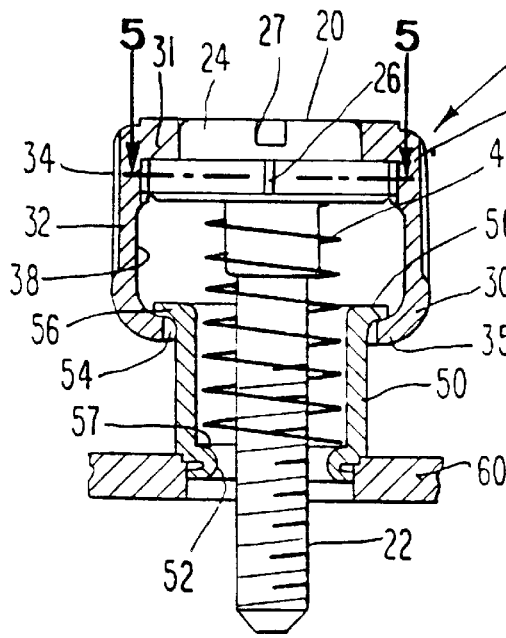
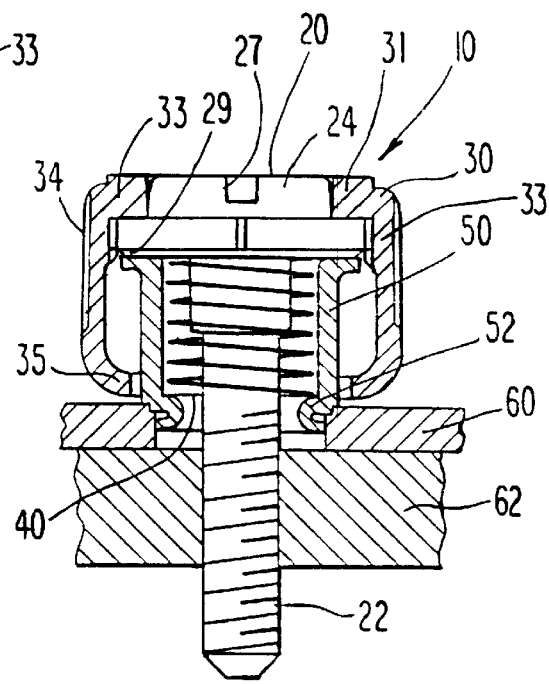
Fig. 1
Fig. 5
Fig. 4
Fig. 2
Fig. 3

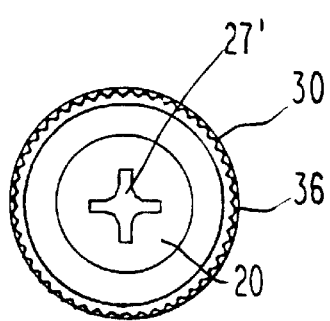
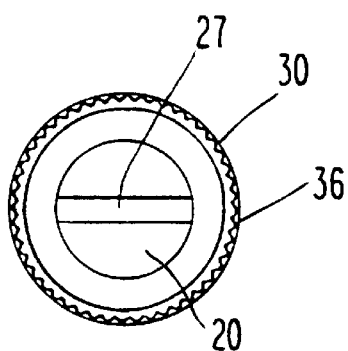
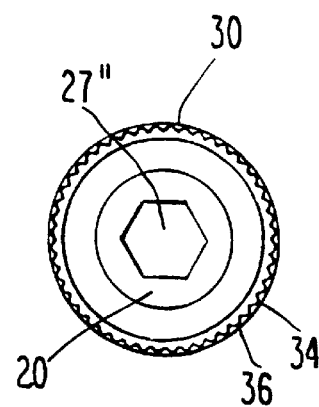
Fig. 6a    Fig. 6b    Fig. 6c
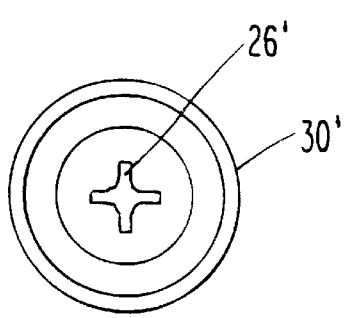
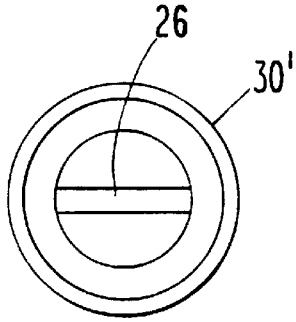
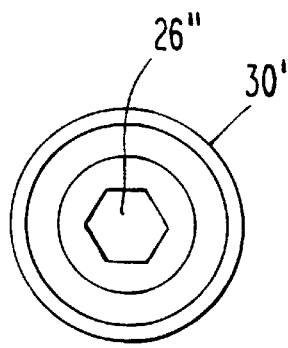
Fig. 7a    Fig. 7b    Fig. 7c

CAPTIVE SCREW

BACKGROUND OF THE INVENTION

This invention relates to captive screws of the type generally used to attach a first panel to a second panel, frame or other surface wherein it is desired to keep the fastener in position on the first panel without loose items of hardware. The captive screw is mounted to the upper panel such that the screw stays attached to the panel even when the threads of the screw are fully disengaged from a threaded hole in the second panel to which the first panel is attached.

The present invention is directed toward a new and improved captive screw of a type which has a knob, a screw, and a ferrule. The captive screw is captivated on a panel by the ferrule and as the screw is screwed into a second panel the knob telescopically retracts over the ferrule. A spring may be used which urges the knob and integral screw to its fully retracted position when the captive screw is not attached to the second panel, thereby withdrawing the threads of the screw from the area of the lower panel.

Captive screws of the foregoing type in general are disclosed in, for example, Frattarola, U.S. Pat. No. 5,382,124 and French Patent 1,339,942. These patents depict captive screws of the general type herein but contain different configurations where the screw head mates integrally with the knob of the captive screw.

SUMMARY OF THE INVENTION

This invention relates to a low profile, retractable captive screw of the type wherein a first panel or other thin flat surface is to be mounted against another surface, such as a second panel or frame. The captive screw of the present invention has a unique configuration in the means by which the screw portion of the captive screw is mounted to the knob of the captive screw. The screw is attachable to the first panel, and is used for attaching the first panel to a lower surface, the lower surface having a threaded hole. The captive screw has a screw with or without an added flange surrounding the periphery of the head of the screw with protrusions integral to the outer perimeter of the screw head or flange, a thin-walled, cylindrical hollow knob that rigidly attaches to the screw, a ferrule that attaches to the upper panel and to the knob, and a spring. The flange with the protrusions or the screw head with the protrusions rigidly secures the screw head to the inner surface of the knob and provides a press-fit of the screw to the inner surface of the knob. The flange, if used, provides significant advantages in that it provides for a positive stop when the screw is pressed into the knob. Further, the screw head is installed into the knob from the bottom side of the knob rather than the top side of the knob as in similar prior art screws, providing further advantages as described below.

A second means for attachment of the screw to the knob allows for a press fit of the screw into the knob by filling in a chamfer on the periphery of the screw with material from the inner surface of the knob. This new construction provides significant structural advantages over prior art captive screws. The screw applies force directly through the ferrule rather than through a portion of the knob as in some similar prior art screws. The construction of the knob/screw interface allows for insertion of the screw into the bottom of the knob, rather than the top of the knob. In failure of the knob screw interface, the captive screw of the present invention still retains the panels to which the captive screw is attached. Even if the knob breaks free of the screw while the screw is in the open position, the knob is still retained on the screw, the screw is retained in the captive screw assembly, and the screw functions.

It is therefore an object of the present invention to provide a captive screw that provides for an improved, stronger knob/screw interface.

It is a further object of the present invention to provide a captive screw that provides for an improved, stronger knob/screw interface that provides for more surface area and therefore a stronger assembly, particularly when the captive screw is pressed onto a panel.

Other objects and advantages of the present invention will become apparent from the following description taken in conjunction with the accompanying drawings.

BRIEF DESCRIPTION OF THE DRAWINGS

FIG. 1 is a side elevation view of the captive screw embodying the present invention, with the knob in the extended position.

FIG. 2 is a cross-sectional view of the captive screw of FIG. 1 taken along line 2—2 of FIG. 1.

FIG. 3 is the cross-sectional view of the captive screw of FIG. 2 with the knob in the depressed position with the screw in a fully extended position.

FIG. 4 is a perspective view of a screw as used in the captive screw of FIG. 1.

FIG. 5 is a cross-sectional view of the captive screw of FIG. 1, taken along line 5—5 of FIG. 2.

FIG. 6a is a top view of the captive screw of FIG. 1 depicting a Phillips screwdriver recess.

FIG. 6b is a top view of the captive screw of FIG. 1 depicting a slotted screwdriver recess.

FIG. 6c is a top view of the captive screw of FIG. 1 depicting a hex driver recess.

FIG. 7a is a top view of an alternate embodiment of the captive screw of FIG. 1 having a smooth knob and a Phillips screwdriver recess.

FIG. 7b is a top view of an alternate embodiment of the captive screw of FIG. 1 having a smooth knob and a slotted screwdriver recess.

FIG. 7c is a top view of an alternate embodiment of the captive screw of FIG. 1 having a smooth knob and a hex driver recess.

DESCRIPTION OF THE PREFERRED EMBODIMENT

Figure 8:
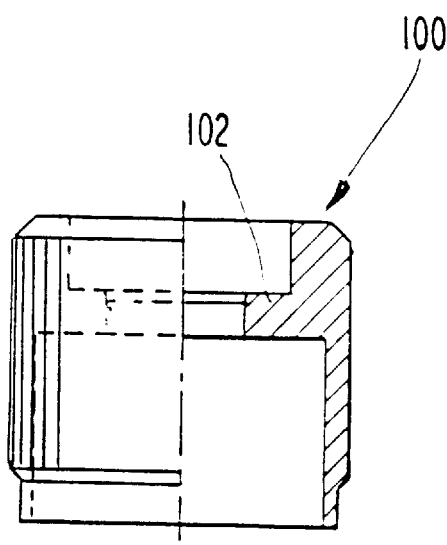
FIG. 8 is a partially cut away side elevation view of a knob as used on a prior art captive screw, prior to assembly with a ferrule, spring and screw.

Referring now in detail to the drawings wherein like reference numbers indicate like elements throughout the several views, there is shown in FIGS. 1, 2 and 3 a retractable captive screw 10 in accordance with one preferred embodiment of the present invention. The illustrative device is shown generally comprising a screw 20 having a threaded shaft 22 and a screw head 24, a generally cylindrical thin-walled hollow knob 30, a spring or other biasing means 40, a generally cylindrical hollow ferrule 50, with a panel attachment means 52, and a screw captivation means 54. The illustrative device is shown in FIGS. 1, 2 and 3 as installed on a first panel 60. FIG. 3 depicts the captive screw as installed on a first panel 60 and screwed into second panel 62.

The generally cylindrical, partially hollow knob 30 has a hollow cylindrical body 32 that preferably has a region of increased thickness 33 near the upper end of the knob 30 and a top annular surface 31 against which the head 24 of screw 20 sits. As seen in FIG. 4, the screw 20 has an annular flange 23 around the lower end of the screw head 24 and a plurality of protrusions 26 integral to an outer perimeter 25 of the annular flange 23 around screw head 24. These protrusions 26 provide a press-fit to the region of increased thickness 33 on the inner surface of the knob 30 whereby material in the knob 30, which is preferably made from a soft material relative to the screw head 24 such as aluminum, is displaced by the protrusions 26 of the screw 20, which is made from a relatively hard material, such as stainless steel. The screw 20 is thereby rigidly secured to the knob 30.

It has been found that approximately four protrusions 26, evenly spaced around the outer circumference of the screw head 24 are satisfactory for purposes of the present invention. Additionally, it has been found that the protrusions 26 may be generally square or rectangular in cross-section. A multitude of variations in the quantity and cross-sectional shape of the protrusions 26 will likely also produce satisfactory results so long as the screw head 24 is rigidly attached to the knob 30 when properly installed. The above has been found to be the optimal configuration.

Figure 10:
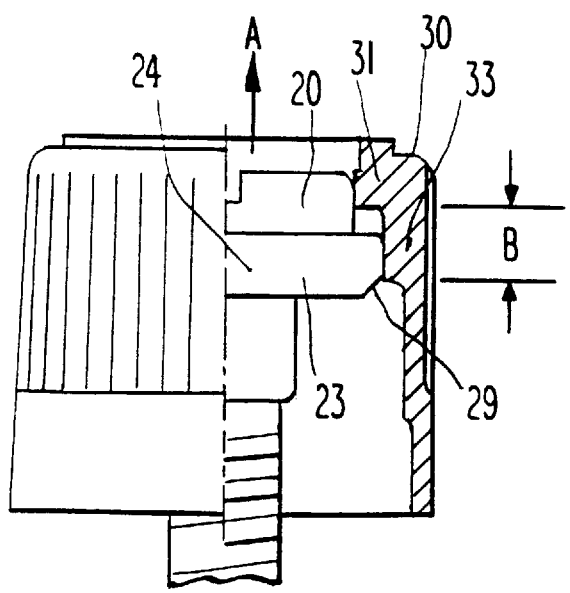
FIG. 10 is a partially cut away side elevation view of a knob/screw assembly as used on the captive screw of FIG. 1, with the optional additional chamfer of the screw as a knob/screw retention means, during the assembly of the knob and the screw.
Figure 11:
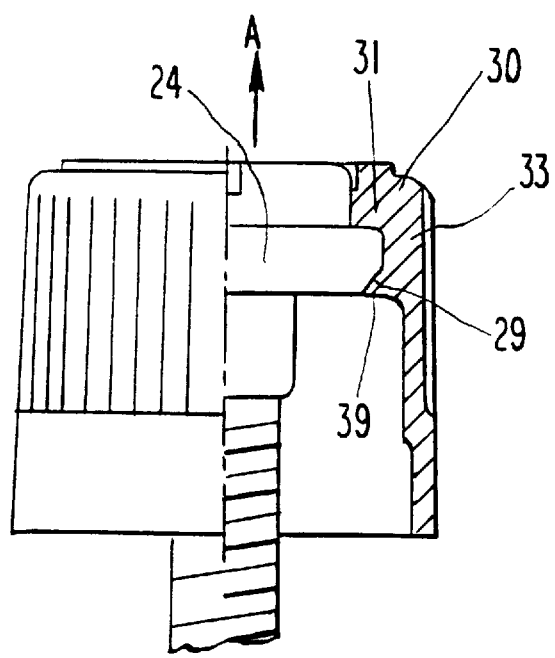
FIG. 11 is a partially cut away side elevation view of the knob/screw assembly of FIG. 10, upon completion of the knob/screw assembly.

Additionally, further structure may optionally be provided to further secure the knob 30 to the screw head 24 as can be seen in FIGS. 10 and 11. At the lower surface of the annular flange 23 of the screw 20 is an optional chamfer 29. A chamfer of 0.025 inches at, for example, approximately fifteen to thirty degrees has been found to be suitable for most screw sizes. FIG. 10 depicts a knob/screw assembly during the pressing-in of the screw prior to the point where the screw has been fully pressed-in to the knob 30. Note that the protrusions 26 as described above are not shown in FIGS. 10 and 11. The protrusions 26 may or may not be used. As the screw head 24 is pressed further into the inner surface of the knob 30 in direction of arrow A in FIGS. 10 and 11, material from the lower end of the region of increased thickness of the knob 33 is pressed such that the material flows into the chamfer 29 area such that this annular ring of material 39 holds the screw head 24 to the knob 30. The region of increased thickness 33, i.e. the distance between the top annular surface 31 or cap section of the knob 30 and the bottom of the region of increased thickness 33 of the knob 24 (Distance B in FIG. 10), is slightly longer in its axial dimension than the total thickness of the annular flange 23 around the screw head such that, while the screw head 24 is pressed into the knob 30 in direction A, the knob material flows into the area of the chamfer 29 and then is positively stopped.

Figure 9:
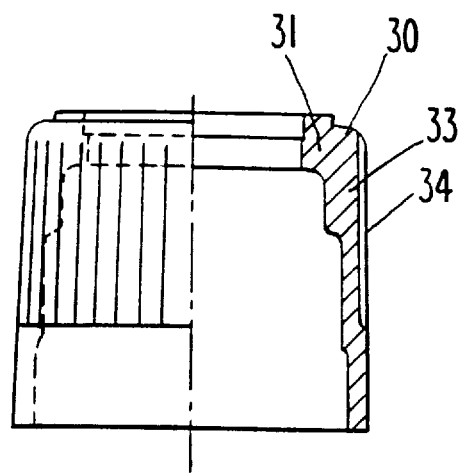
FIG. 9 is a partially cut away side elevation view of a knob as used on the captive screw of FIG. 1, prior to assembly with the ferrule, spring and screw.

Previous captive screws typically had more complex knob shapes in the interior of the knob. For example, as depicted in FIG. 8 which shows a prior art knob 100 prior to its assembly during manufacturing, annular surface 102 is used which holds a screw in place (not shown). This screw is pressed into place in the knob 100 and is held in place by a splined section below the screw head. This arrangement is shown in more detail in FIG. 1 of U.S. Pat. No. 5,382,124. That annular surface 102 is not required in the present captive screw since the screw 20 is held in place at the perimeter of the screw head flange 23. As shown in FIG. 9, the knob 30 of the present invention has a more simple internal design. The annular surface 102 of the prior art knob 100 is no longer used since the screw 20 of the present invention is held in place by the protrusions 26 on the outer perimeter of the screw head 24 or flange 23 as can be seen in FIGS. 1–5, and/or the chamfer 29 as described above and seen in FIGS. 10 and 11, rather than the splined section on the screw shaft of the prior art. Significant structural advantages of the present screw exist over prior captive screws having the annular flange within their knobs. In the present captive screw 10, the bottom annular surface of the screw 20 is in direct contact with the ferrule when the screw is in the fully extended position, i.e. when the first panel 60 is screwed down to the second panel 62 as depicted in FIG. 3. The load of the screw 20 runs directly from screw 20 to ferrule 30 to panel 60. This eliminates any breakage problems of the prior art knob annular flange 102 during both assembly of the screw 20 to the knob 30 and during use of the captive screw 10 of the present invention. Additionally, the flange 23 provides a positive stop during the assembly of the screw 20 to the knob 30. This provides for extremely tight tolerances and reliability with respect to the structural integrity of the captive screw. Additionally, the added surface area where the flange 23 bears against the ferrule 30 provides increased structural integrity, particularly during the installation of the screw 10 to a panel 60.

The screw 20 also has an optional region of increased shaft thickness 21 in the area of the screw shaft 22 adjacent the screw head 24 or flange 23. This region of increased shaft thickness provides two valuable functions. First, it simplifies manufacturing of the screw since, the step-up in diameter from the screw shaft to the outer perimeter of the screw head 24, particularly if the flange 23 is used, is particularly difficult to manufacture. Second, it provides for increased volume of material where a Phillips style screw driver recess (see FIG. 6a) or a Torx style (not shown) recess is used.

The remaining structure of a typical captive screw of the present invention is preferably as follows. Integral to the head 24 of the screw 20 is a driving recess, for example, a recessed slot 27 (see FIGS. 2–4, 6b, and 7b), for use with a slotted-type screwdriver. As shown in FIGS. 6a, 6c, 7a, and 7c, alternate embodiments may include a Phillips-type recess 27' for use with a Phillips-type screwdriver, a socket recess 27" for use with a socket wrench or any other drive recess as is known in the art, for example a Torx recess. Optionally, disposed on the outer circumferential surface 34 of the knob 30 are axial scored lines 36 to facilitate tightening of the retractable captive screw 10 using only fingers, without tools, or to facilitate the initial alignment of the screw threads 22 with a threaded hole in a second panel 62. Alternate embodiments may include a knurling pattern or other frictional surface (not shown) or a smooth surface knob 30' such as that shown in FIGS. 7a, 7b, and 7c.

As can be seen in FIGS. 2 and 3, the knob 30 is attached to the ferrule 50, however, full rotational movement of the knob 30 with respect to the ferrule 50, and a limited amount of axial movement of the knob 30 with respect to the ferrule 50, preferably corresponding to screw engagement length, are provided. The limited axial movement is accomplished by a first annular flange 35 on the knob 50 extending inward from the inner surface 38 of the hollow knob 30 towards the threaded shaft 22, in combination with a second annular flange 56, integral to the ferrule 50, extending outward from the body of the ferrule 50 at the knob end or first end of the ferrule 50. The inside surface 38 of the hollow knob 30 has a larger diameter than the outside diameter of the ferrule annular flange 56 such that a portion of the ferrule 50 is slidable within the hollow cylindrical body 32 of the knob 30. When the captive screw 10 is engaged, i.e. when two panels are rigidly connected by the captive screw 10, the upper end of the ferrule 50 is inserted into the hollow cylindrical body of the knob 30. The first and second annular flanges 35 and 56 allow the knob 30 and the ferrule 55 to be a single, non-detachable assembly, while allowing for radial and axial movement of the knob 30 with respect to the ferrule 50.

Encased between the lower end of the ferrule 50 and the head 24 of the screw 20 is a spring 40. Preferably at the lower end or second end of the ferrule 50, adjacent the panel attachment means 52, is an annular surface 57 protruding inwardly toward the axial center of the ferrule. This annular surface 57 serves to function as a termination point for one end of spring 40. The opposite end of spring 40 is terminated at the underside of screw head 24, as depicted in FIGS. 2 and 3. When the spring 40 is in its most compressed position as shown in FIG. 3, the knob 30 is at its lowest position, i.e. the upper end of the ferrule 50 is in contact with the underside of the screw head 24. Here, the screw 20 is inserted in the lower panel to its limit. When the spring 40 is in its most uncompressed condition as shown in FIG. 2, the screw 30 is at its most extended position, i.e. the first annular flange 35 on the knob 30 and the second annular flange 56 on the ferrule are in contact with each other as described above.

The panel attachment means 52 may be any such means known in the art, e.g. press-in as depicted in the present figures, snap-in as depicted in U.S. Pat. No. 5,382,124, swaged, screwed, or the like, as is known in the art.

The new knob/screw interface allows the steel screw 20 to directly contact the steel or aluminum ferrule over a wider area due to the increased width of the annular flange 23, thereby eliminating the aluminum/steel interface of some prior captive screws. This area of increased surface provides improved structure for pressing the captive screw into a panel 60.

Figure 13:
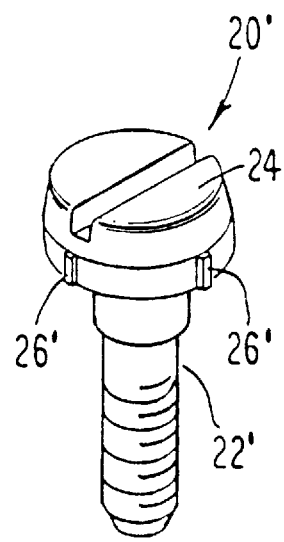
FIG. 13 is a perspective view of an alternate embodiment of a screw as used in the captive screw of FIG. 12.
Figure 12:
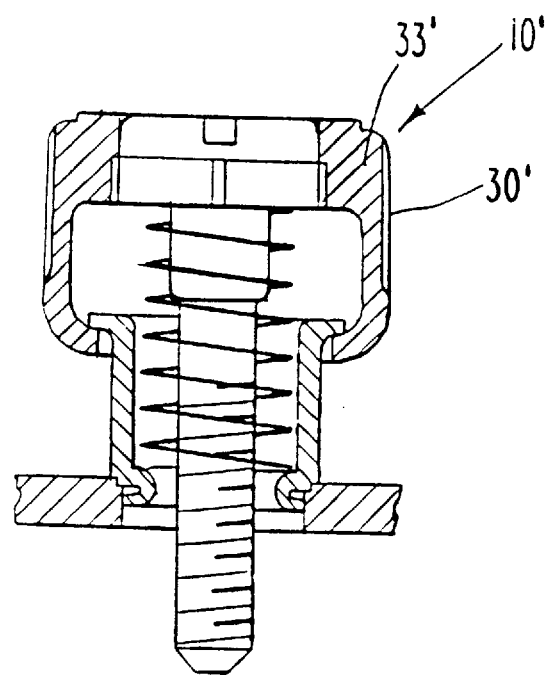
FIG. 12 a side elevation view of an alternate embodiment of the captive screw embodying the present invention, with the knob in the extended position.

An alternate embodiment 10' of the captive screw of the present invention is depicted in FIGS. 12 and 13. Here, there is no annular flange 23 as depicted in the first embodiment, for example, as shown in FIGS. 2 and 4. Here again, there are a plurality of protrusions 26' that are pressed into place in a region of increased thickness 33' of knob 30'. The advantages described above for the first embodiment specifically with respect to the additional annular flange 23 are reduced, however, this embodiment can be manufactured less expensively due to the reduced complexity. This embodiment does retain the advantages of the structure by virtue of the fact that the screw installs through the bottom of the knob, rather than the top, as in prior art screws.

It will be recognized by those skilled in the art that changes may be made in the above described embodiments of the invention without departing from the broad inventive concepts thereof. It is understood, therefore, that this invention is not limited to the particular embodiments disclosed, but is intended to cover all modifications which are within the scope and spirit of the invention as defined by the appended claims.

We claim:

1. A captive screw attachable to a panel, for attaching the panel to a surface, the surface having a threaded hole, the captive screw comprising:

a) a screw having a head portion and a threaded shaft, said head portion having a top surface, a flat, annular bottom surface, and a plurality of integral protrusions extending at least partially therebetween;

b) means to facilitate rotation of the threaded shaft;

c) a thin-walled, cylindrical, hollow knob comprising a first end having an annular top surface, a second end, and an inner surface;

d) means to rigidly secure the head portion of the screw to the inner surface of the knob, said means comprising the plurality of protrusions providing a press-fit to the inner surface of the knob when the screw head is inserted through the second end of the hollow knob; and e) a hollow ferrule having a first end and a second end through which the threaded shaft slides, the ferrule having a panel attachment means at the first end to secure the captive screw to the panel, and a threaded shaft captivation means, said threaded shaft captivation means adjacent the second end, wherein the second end of the ferrule is slidably and rotatably attached to the knob such that when the threaded shaft is in a retracted position, the threaded shaft captivation means prevents the ferrule and the knob from separating and when the threaded shaft is in an extended position, the flat, annular bottom surface of the head portion of the screw is in contact with the second end of the ferrule.

2. The captive screw of claim 1, wherein the means to rigidly secure the head portion of the screw to the inner surface of the knob includes an annular chamfer at a lower end of the head of the screw allowing for flow of material from the inner surface of the knob into the chamfer area during a press-in assembly to further secure the knob to the screw.

3. The captive screw of claim 1, including a biasing means, extending between the ferrule and the screw, that urges the threaded shaft towards a fully retracted position when no downward axial force is applied to the screw.

4. A captive screw attachable to a panel, for attaching the panel to a surface, the surface having a threaded hole, the captive screw comprising:

a) a screw having a head portion and a threaded shaft, said head portion having a lower end and an upper end;

b) means to facilitate rotation of the threaded shaft;

c) a thin-walled, cylindrical, hollow knob comprising a first end having an annular top surface, a second end, and an inner surface;

d) means to rigidly secure the head portion of the screw to the inner surface of the knob comprising an annular flange, integral to and around the lower end of the head portion of the screw and including a plurality of protrusions integral to an outer perimeter of the annular flange around the head portion of the screw, the protrusions providing a press-fit to the inner surface of the knob, said annular top surface of the knob providing a stop to allow said head portion of the screw to be pressed to a required distance and then stopped by the interface of the flange on the screw and the annular top surface of the knob; and e) a hollow ferrule having a first end and a second end through which the threaded shaft slides, the ferrule having a panel attachment means at the first end to secure the captive screw to the panel and a threaded shaft captivation means, said threaded shaft captivation means adjacent the second end, wherein the second end of the ferrule is slidably and rotatably attached to the knob such that when the threaded shaft is in a fully retracted position, the threaded shaft captivation means prevents the ferrule and the knob from separating, and when the threaded shaft is in a fully extended position, the flat, annular bottom surface of the head portion of the screw is in contact with the second end of the ferrule.

5. The captive screw of claim 4, wherein the means to rigidly secure the head portion of the screw to the inner surface of the knob includes an annular chamfer at the lower end of the annular flange allowing for flow of material from the inner surface of the knob into the chamfer area during a press-in assembly to further secure the knob to the screw.

6. The captive screw of claim 4, including a biasing means, extending between the ferrule and the knob, that urges the threaded shaft towards a fully retracted position when no downward axial force is applied to the knob.

7. A captive screw attachable to a panel, for attaching the panel to a surface, the surface having a threaded hole, the captive screw comprising:
   a) a screw having a head portion and a threaded shaft, said head portion having a flat, annular bottom surface;
   b) means to facilitate rotation of the threaded shaft;
   c) a thin-walled, cylindrical, hollow knob having a region of increased wall thickness adjacent a top surface of the knob and an annular end cap, said annular end cap providing access to the means to facilitate rotation;
   d) means to rigidly secure the head portion of the screw to the region of increased wall thickness of the knob, comprising:
      i) a plurality of protrusions integral to an outer perimeter of the head portion of the screw, the protrusions defining an outer diameter greater than the outer diameter of the head portion of the screw;
      ii) the region of increased wall thickness of the knob having a cylindrical inner surface of a lesser diameter than the outer diameter defined by the protrusions, and of greater diameter than the outer perimeter of the head portion of the screw;
      iii) said annular end cap providing a stop to allow said head portion of the screw to be pressed to a required distance; and
      iv) wherein the head portion of the screw is rigidly secured by an interference fit to the region of increased wall thickness of the knob; and
   e) a hollow ferrule having a first end and a second end, through which the threaded shaft slides, the ferrule having a panel attachment means at the first end to secure the captive screw to a panel, and a threaded shaft captivation means, said threaded shaft captivation means adjacent the second end, wherein the second end of the ferrule is slidably and rotatably attached to the knob such that when the threaded shaft is in a fully retracted position, the threaded shaft captivation means prevents the ferrule and the knob from separating, and when the threaded shaft is in a fully extended position, the flat, annular bottom surface of the head portion of the screw is in direct contact with the second end of the ferrule.

8. The captive screw of claim 7, including a biasing means, extending between the ferrule and the knob, that urges the threaded shaft towards a fully retracted position when no axial downward force is applied to the knob.

9. The captive screw of claim 7, wherein the means to rigidly secure the head portion of the screw to the inner surface of the knob includes an annular chamfer at a lower end of the head of the screw allowing for flow of material from the inner surface of the knob into the chamfer area during a press-in assembly to further secure the knob to the screw.

10. A captive screw attachable to a panel, for attaching the panel to a surface, the surface having a threaded hole, the captive screw comprising:
    a) a screw having a head portion and a threaded shaft;
    b) means to facilitate rotation of the threaded shaft;
    c) a thin-walled, cylindrical, hollow knob having an inner surface;
    d) means to rigidly secure the head portion of the screw to the inner surface of the knob comprising an annular chamfer at a lower end of the head portion of the screw which allows for flow of material from the inner surface of the knob into the chamfer area during a press-in assembly to secure the knob to the screw; and
    e) a hollow ferrule having a first end and a second end through which the threaded shaft slides, the ferrule having a panel attachment means at the first end to secure the captive screw to the panel and a threaded shaft captivation means, said threaded shaft captivation means adjacent the second end, wherein the second end of the ferrule is slidably and rotatably attached to the knob such that when the threaded shaft is in a fully retracted position, the threaded shaft captivation means prevents the ferrule and the knob from separating.

11. The captive screw of claim 10, including a biasing means, extending between the ferrule and the knob, that urges the threaded shaft towards a fully retracted position when no axial downward force is applied to the knob.

12. The captive screw of claim 10 wherein the head portion of the screw has a flat, annular bottom surface and when the shaft is in a fully extended position, the flat annular bottom surface is in direct contact with the second end of the ferrule.

13. A captive screw attachable to a panel, for attaching the panel to a surface, the surface having a threaded hole, the captive screw comprising:
    a) a screw having a head portion and a threaded shaft, said head portion having a lower end and an upper end;
    b) means to facilitate rotation of the threaded shaft;
    c) a thin-walled, cylindrical, hollow knob comprising a first end having an annular top surface and an inner surface;
    d) means to rigidly secure the head portion of the screw to the inner surface of the knob comprising an annular flange, integral to and around the lower end of the head portion of the screw and an annular chamfer at the lower end of the annular flange, said chamfer allowing for flow of material from the inner surface of the knob into the chamfer area during a pressin assembly to secure the knob to the screw, said annular top surface of the knob providing a stop to allow said head portion of the screw to be pressed to a required distance and then stopped by the interface of the flange on the screw and the annular top surface of the knob; and
    e) a hollow ferrule having a first end and a second end through which the threaded shaft slides, the ferrule having a panel attachment means at the first end to secure the captive screw to a panel, and a threaded shaft captivation means, said threaded shaft captivation means adjacent the second end, wherein the second end of the ferrule is slidably and rotatably attached to the knob such that when the threaded shaft is in a fully retracted position, the threaded shaft captivation means prevents the ferrule and the knob from separating, and when the threaded shaft is in a fully extended position, the flat, annular bottom surface of the head portion of the screw is in direct contact with the second end of the ferrule.

14. The captive screw of claim 13, including a biasing means, extending between the ferrule and the knob, that urges the threaded shaft towards a fully retracted position when no axial downward force is applied to the knob.

15. The captive screw of any one of claims 1, 4, 7, 10, or 13, wherein the screw shaft has a region of increased thickness to provide for increased strength of the screw head and shaft interface.

16. For a captive screw having a knob, a screw and a ferrule, a method of attaching the knob to the screw comprising:

a) providing a screw having a head having a head diameter and an annular chamfer around the base of the head of the screw and a plurality of protrusions protruding from the head of the screw, b) providing a knob having an internal diameter generally equal to or smaller than the diameter of the head of the screw; and c) attaching the screw into the knob by displacing knob material into the chamfer around the base of the head of the screw and by creating a press fit by displacing knob material caused by the protrusions on the head of the screw.

17. The method of claim 16, wherein the head of the screw has an annular flange at the lower end of the head of the screw, the flange has a chamfer around the base, and the protrusions protrude from the annular flange on the head of the screw.

* * * * *

(12) REEXAMINATION CERTIFICATE (4462nd)
United States Patent
Ellis et al.

(10) Number: US 5,851,095 C1
(45) Certificate Issued: Oct. 16, 2001

(54) CAPTIVE SCREW

(75) Inventors: Thomas J. Ellis, Wilmington, DE (US); Edward A. McCormack, Chadds Ford; Harry L. Dickerson, Downingtown, both of PA (US)

(73) Assignee: Southco, Inc., Concordville, PA (US)

Reexamination Request:
No. 90/005,382, Jun. 3, 1999

Reexamination Certificate for:
Patent No.: 5,851,095
Issued: Dec. 22, 1998
Appl. No.: 09/059,577
Filed: Apr. 14, 1998

(51) Int. Cl.[7] ............... F16B 21/18; F16B 39/00
(52) U.S. Cl. ............ 411/353; 411/107; 411/396; 411/552
(58) Field of Search .................. 411/107, 352, 411/353, 383, 396, 552, 970, 999

(56) References Cited

U.S. PATENT DOCUMENTS

| 3,074,292 | 1/1963 | Polmon | 74/553 |
|---|---|---|---|
| 3,245,450 | 4/1966 | Sauter . | |
| 3,502,130 | 3/1970 | Gulistan . | |
| 5,382,124 | 1/1995 | Frattarola | 411/352 |
| 5,642,972 | 7/1997 | Ellis et al. | 411/353 |
| 5,851,095 | 12/1998 | Ellis et al. | 411/353 |

OTHER PUBLICATIONS

Catalog—Huck International, Inc., Lakewood, CA 90712; Captive Fasteners And Rivetless Nut Plates; Index Tab "Captive Screws, Press–in Type"; Code ID #97928, "Deutschsert, Press–In Captive Screw, Floating, Retractable"; three pages (1994).
Office Action dated Jun. 21, 1998, Serial No. 09/059,577, pp. 2–4; U.S. Pat. No. 5,851,095, Ellis et al.

Primary Examiner—Neill Wilson

(57) ABSTRACT

A captive screw attachable an upper panel, for attaching the upper panel to a lower surface, the lower surface having a threaded hole, the captive screw having a screw, a ferrule that attaches to the upper panel, a thin-walled, cylindrical hollow knob and protrusions integral to the outer perimeter of the head portion of the screw to rigidly secure the perimeter of the head of the screw to the inner surface of the knob, the protrusions providing a press-fit of the screw to the inner surface of the knob where the screw is pressed into the knob from the underside of the knob.

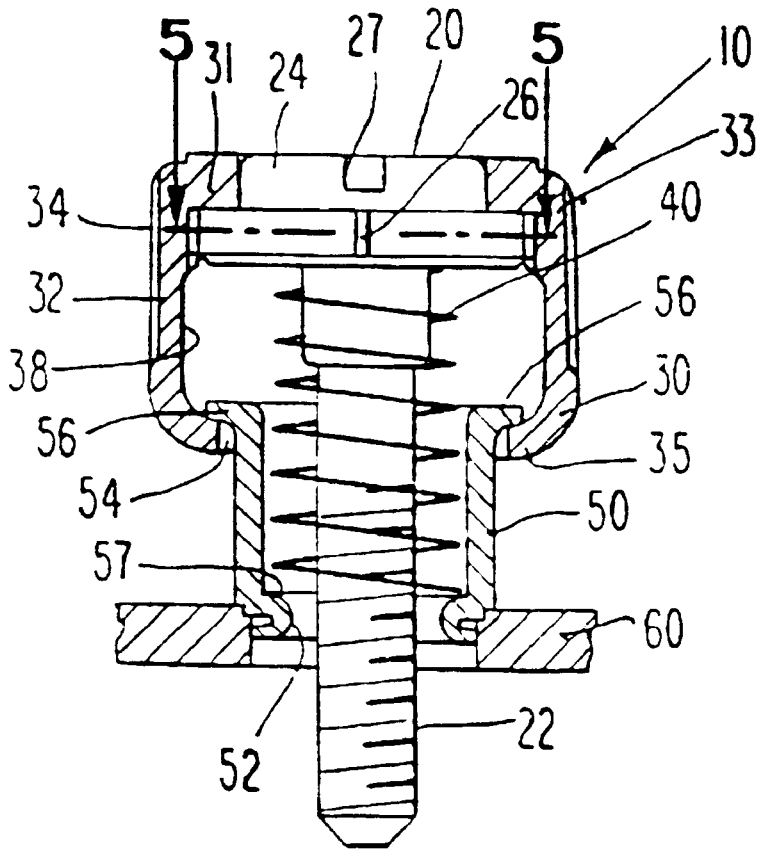

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1–15 is confirmed.

Claim 16 is determined to be patentable as amended.

Claim 17, dependent on an amended claim, is determined to be patentable.

16. For a captive screw having a knob, a screw and a ferrule, a method of *rigidly* attaching the knob to the screw comprising:

a) providing a screw having a head having a head diameter and an annular chamfer around the base of the head of the screw and a plurality of protrusions protruding from the head of the screw, b) providing a knob having an internal diameter generally equal to or smaller than the diameter of the head of the screw; and c) attaching the screw into the knob by displacing knob material into the chamfer around the base of the head of the screw and by creating a press fit by displacing knob material caused by the protrusions on the head of the screw.

\* \* \* \* \*